(No Model.)

W. G. BROWNE.
CAN OPENER.

No. 561,482.　　　　　　　　　　Patented June 2, 1896.

Witnesses
C. E. Buckland.
Andrew Ferguson.

Inventor
William G. Browne
By W. E. Simonds
Attorney

UNITED STATES PATENT OFFICE.

WILLIAM G. BROWNE, OF MERIDEN, CONNECTICUT.

CAN-OPENER.

SPECIFICATION forming part of Letters Patent No. 561,482, dated June 2, 1896.

Application filed August 17, 1895. Serial No. 559,676. (No model.)

*To all whom it may concern:*

Be it known that I, WILLIAM G. BROWNE, a citizen of the United States of America, residing at Meriden, in the county of New Haven and State of Connecticut, have invented a certain new and useful Improvement in Can-Openers, of which the following is a description, reference being had to the accompanying drawings, wherein—

Figure 1:
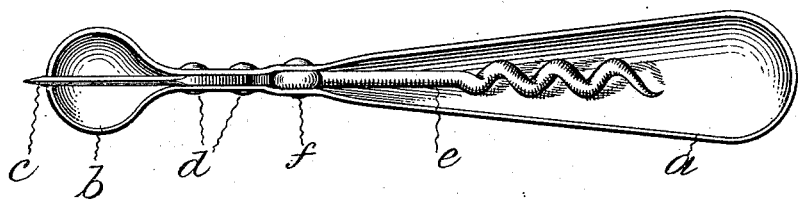
Figure 2:
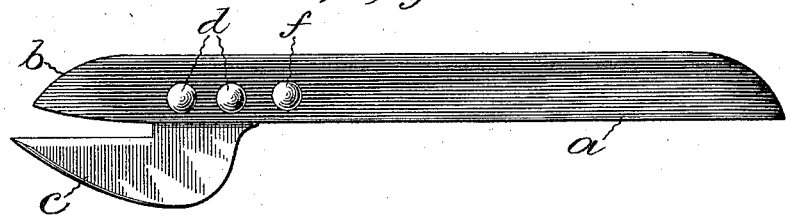

Figure 1 is a lengthwise view of a can-opener embodying said improvement, looking into the open side of the dish-shaped handle and the dish-shaped fulcrum. Fig. 2 is a side view of the same.

The object of the improvement is the production of a cheap and efficient can-opener.

In the accompanying drawings the letter $a$ denotes the handle, $b$ the fulcrum, and $c$ the blade. The handle and the fulcrum are of one piece of metal. The handle is formed into a dish shape. The fulcrum is formed into a dish shape and the base of the blade is fastened to this one piece.

The preferred and the most practical mode of producing the combined dish-shaped fulcrum and the dish-shaped handle is to swage or form it of sheet metal, bringing the two sides together at the proper place to embrace the base of the blade and fastening the two together, as by rivets $d$. This mode of construction gives a peculiarly strong handle and fulcrum, produced in a very cheap and simple manner, and affords a means and method of fastening in the blade in the strongest and cheapest manner. The dish-shaped handle serves also to contain a corkscrew $e$, pivoted on the rivet $f$.

I claim as my improvement—

As a new article of manufacture the herein-described can-opener, consisting of the concave or dish-shaped handle with dish-shaped fulcrum $b$, all in one piece, compressed intermediately to hold the blade, blade $c$, confined by rivets $d$, and corkscrew pivoted to the rivet $f$, all substantially as and for the purpose specified.

WILLIAM G. BROWNE.

Witnesses:
 WILBUR F. DAVIS,
 WILLIAM C. MUELLER.